US005477464A

United States Patent [19]

Jacobsson

[11] Patent Number: 5,477,464

[45] Date of Patent: Dec. 19, 1995

[54] METHOD FOR CONTROLLING THE CURRENT PULSE SUPPLY TO AN ELECTROSTATIC PRECIPITATOR

[75] Inventor: Hans Jacobsson, Stockholm, Sweden

[73] Assignee: ABB Flakt AB, Stockholm, Sweden

[21] Appl. No.: 240,699

[22] PCT Filed: Nov. 26, 1991

[86] PCT No.: PCT/SE92/00815

§ 371 Date: May 9, 1994

§ 102(e) Date: May 9, 1994

[87] PCT Pub. No.: WO93/10902

PCT Pub. Date: Jun. 10, 1993

[30] Foreign Application Priority Data

Nov. 26, 1991 [SE] Sweden .................................. 9103489

[51] Int. Cl.[6] .................................................. G05B 13/02

[52] U.S. Cl. .......................... 364/483; 323/903; 364/148

[58] Field of Search .............................. 95/81; 96/18, 25; 323/903; 364/148, 483

[56] References Cited

U.S. PATENT DOCUMENTS

| | | | |
|---|---|---|---|
| 3,915,672 | 10/1975 | Penney | 95/81 |
| 4,052,177 | 10/1977 | Kide | 55/139 |
| 4,267,502 | 5/1981 | Reese et al. | 323/237 |
| 4,311,491 | 1/1982 | Bibbo et al. | 55/2 |
| 4,410,849 | 10/1983 | Ando | 323/237 |
| 4,626,260 | 12/1986 | Jorgensen | 95/6 |
| 4,626,261 | 12/1986 | Jorgensen | 95/6 |
| 4,867,765 | 9/1989 | Tomimatsu et al. | 96/82 |
| 5,217,504 | 6/1993 | Johansson | 95/7 |
| 5,288,303 | 2/1994 | Woracek et al. | 95/2 |
| 5,311,420 | 5/1994 | Zarfoss et al. | 364/148 |

FOREIGN PATENT DOCUMENTS

| | | |
|---|---|---|
| 0162826 | 11/1985 | European Pat. Off. . |
| 0184922 | 6/1986 | European Pat. Off. . |
| WO90/11132 | 10/1990 | WIPO . |

*Primary Examiner*—Edward R. Cosimano
*Attorney, Agent, or Firm*—Burns, Doane, Swecker & Mathis

[57] ABSTRACT

The present invention relates to a method for controlling, in an electrostatic precipitator unit comprising discharge electrodes and collecting electrodes between which a varying high voltage is maintained, a pulsating direct current supplied to these electrodes. In the method according to the invention the frequency, pulse charge and/or pulse duration of the pulsating direct current are caused to vary such that a plurality of combinations of frequency, charge and duration are obtained. For each of these combinations, the voltage U between discharge electrodes and collecting electrodes is measured, and for each of these combinations, a voltage level $U_{ref}$ is determined, measured or calculated. In a defined time interval, for each of these combinations, either the integral $I_k=\int U\cdot(U-U_{ref}).dt$ is measured and/or calculated during the time interval, or $A_i=U\cdot(U-U_{ref})$ is measured at a number of points of time, whereupon $I_k$ or linear combinations of $A_i$ are used to select the combination of frequency, charge and duration of the pulsating direct current.

20 Claims, 4 Drawing Sheets

METHOD FOR CONTROLLING THE CURRENT PULSE SUPPLY TO AN ELECTROSTATIC PRECIPITATOR

BACKGROUND OF THE INVENTION

1) Field of the Invention

The present invention relates to a method for controlling, in an electrostatic precipitator unit comprising discharge electrodes and collecting electrodes between which a varying high voltage is maintained, a pulsating direct current supplied to the electrodes.

The method is particularly suitable when the pulsating direct current is in the form of a pulse train which is synchronized with the frequency of the voltage from a main source and whose pulses are generated by supplying, by means of a phase angle controlled rectifier (thyristor), part of a half-wave of the mains voltage to the electrodes of the precipitator after step-up transformation, whereupon a plurality of periods of the main voltage may pass without current being supplied to the electrodes. Subsequently, part of a half-wave is again supplied, followed by a plurality of periods without current etc.

2) Description of Related Art

In many contexts, especially in flue gas cleaning, electrostatic precipitators are the most suitable dust collectors. Their design is robust and they are highly reliable. Moreover they are most efficient. Degrees of separation above 99.9% are not unusual. Since, when compared with fabric filters, their operating costs are low and the risk of damage and stoppage owing to functional disorders is considerably smaller, they are a natural choice in many cases.

The requirements of the authorities regarding the level of emissions from e.g. plants in which fossil fuels are combusted, are directed to the total amount of emissions. This means that functional troubles must be taken into consideration. When using electrostatic precipitators, the most frequent trouble is the cleaning of the filter involving rapping, which must be carried out to permit dust deposited on the collecting electrodes to be removed from the filter. In such filter cleaning, the emissions temporarily increase very strongly, if no specific measures are taken. One possible measure is disclosed in EP-162 826.

The total consumption of energy in the electrostatic precipitators in a large incineration plant may amount to several hundred kW. It has therefore become most important to reduce this consumption of energy as far as possible. This is especially important when dust of high resistivity is to be separated. In such cases, it is often necessary to work with extremely unfavorable operational parameters owing to the risk of electric breakdown in the dust layer which successively grows on the collecting electrodes. This leads to charges and dust being emitted from the collecting electrodes, so-called back corona.

In order to optimize the operation and reduce the energy consumption at the same time as the separation is improved, several methods for pulse feeding of the current to the filter have been suggested. Examples are to be found in U.S. Pat. Nos. 4,052,177 and 4,410,849. The former suggests the feeding of pulses in the order of microseconds, which means that the rectifiers become most expensive. The latter suggests pulses in the order of milliseconds, which may be achieved quite simply by selectively controlling ordinary thyristor rectifiers to which main frequency alternating current is supplied.

Independently of the selected technique, one tries of course to use it as efficiently and economically as possible. Above all, the emissions must be lower than the fixed limit values. Next, the costs thereof should be minimized.

The new techniques have resulted in an increasing number of control parameters and, consequently, an increasing complexity in the control systems. Unfortunately, this also means that the actual adjustment may be a major disturbance in the function of the separator. In the same way as the emissions increase during the rapping of the filter, the emissions will increase during the adjustment or during the checking of the control parameters as set.

If adjustment is effected manually by means of the reading on an opacimeter (tester for the optical density of smoke), this takes such a long time that, if the load is frequently changing, the emissions can become so considerable during the actual adjustment that they may certainly become as great an amount of the total emissions as those caused by the filter cleaning operation. Furthermore there is a risk that operational variations affect the adjustment such that the optimization fails if considerable changes in the concentration of dust or gas temperature occur during the time needed for the adjustment.

Moreover, as mentioned above, the actual cleaning of the collecting electrodes by rapping leads to a temporarily strongly increased dust concentration in the emitted gas. Each measurement of the opacity for adjustment of the current supply should therefore be made merely in the periods when no cleaning of the filter is carried out. Since such cleaning takes place frequently in the precipitator which is closest to the combustion chamber, or some other dust source, there is a great risk that the cleaning of the filter still has a decisive negative effect on the adjustment.

Therefore it is extremely important to develop methods for quick and safe adjustment of the current supply to electrostatic precipitators, exclusively based on electrical measurements in the precipitator itself or the associated rectifier. It has proved that even if the cleaning of the filter strongly affects the dust concentration in the gas emitted from the separator, this changes but marginally the relation between current and voltage in a precipitator.

A few experiments with optimization exclusively based on measurement of electric variables have already been made, and U.S. Pat. No. 4,311,491, EP-9090 5714W090 and EP-184 922 may be mentioned as examples. However, these examples suffer from remaining deficiencies in respect of flexibility when modifying the process, and reliability in respect of finding the adjustment that involves a minimum of energy consumption under varying conditions when separating highly resistive dust.

It appears that the methods tried so far do not always result in the optimum combination of parameters when separating highly resistive dust. On the contrary, when changing and apparently deteriorating the combination of parameters, considerable advantages in the form of lower emissions and a lower consumption of energy may be obtained. This is particularly the case for the methods which are based on measurement of the dust concentration, but also for methods suggested to date and based on measurement of electric variables.

Therefore, a main object of the present invention is to provide an improved method for selecting operation parameters for electric precipitators when separating so-called difficult dust, for example highly resistive dust.

A further object of the present invention is to provide a method which, based on the measurement of electric variables only, generally results in a quicker and more reliable adjustment of electrostatic precipitators.

SUMMARY OF THE INVENTION

The present invention relates to a method for controlling, in an electrostatic precipitator unit comprising discharge electrodes and collecting electrodes between which a varying high voltage is maintained, a pulsating direct current supplied to said electrodes. In the method according to the invention, the frequency, pulse charge and/or pulse duration of the pulsating direct current are caused to vary such that a plurality of combinations of frequency, charge and duration are obtained.

For each of these combinations, the voltage U between the discharge electrodes and the collecting electrodes is measured, and for each of these combinations, a voltage level $U_{ref}$ is determined, measured or calculated.

In a defined time interval, for each of these combinations, either the integral $I_k=\int U\cdot(U-U_{ref})\cdot dt$ is measured and/or calculated during the time interval, or $A_i=U\cdot(U-U_{ref})$ is measured and/or calculated at a number of points of time, whereupon $I_k$ or linear combinations of $A_i$ are used to select the combination of frequency, charge and duration of the pulsating direct current.

It has been known for more than fifty years that pulse feeding of the current to electrostatic precipitators results in improved performance characteristics of the separator. This is particularly evident when the dust is difficult to separate, i.e. is highly resistive. As mentioned above, attempts have therefore been made to supply, by means of equipment which sometimes was highly complicated, the required energy to the precipitator also by very short pulses.

Eventually, one became aware that pulses of the same size as the half-waves in ordinary AC voltage as used in the mains supply functioned excellently. This was explained by the fact that the discharges in the dust layer, which cause the so-called back corona, have a time constant of about 1 second. However, this must not be interpreted as if it should take 1 second to charge the layer, even if this mistake is frequently made, but that it takes about 1 second for the layer to discharge when the charging has ceased. The charging is controlled by the supplied charge only, i.e. by the size of the current. Thus, the charging may be effected in less than one millisecond if the current intensity is sufficient.

However, it has for quite some time been regarded to be almost obvious that short pulses with great currents are always desired.

The present invention is based on the unexpected disclosure that also by operation in which the pulse frequency is very low and great charges are supplied by each pulse, the separation of dust may be unsatisfactory, but may quite surprisingly be enhanced to a most considerable extent when the size of the pulses is slightly reduced while the pulse frequency is maintained.

To achieve this, one must according to the proposed method analyze the reaction of the precipitator on each pulse, and not confine oneself to measuring average levels or top levels. The object of this method is that it should be possible to assess the effect of the detrimental current which depends on back corona from the collecting electrodes, and minimize this effect by means of the proposed method.

To this end, a reference voltage level $U_{ref}$ is determined between the top level and bottom level of the voltage between discharge electrodes and collecting electrodes, and a positive value is attached to the time during which the voltage exceeds this level, and a negative value is ascribed to the time during which the voltage is lower than this level. This is done by weighting according to the function $A=U\cdot(U-U_{ref})$, wherein U is the voltage between the electrodes in the precipitator for a given point of time.

To evaluate the pulse by allocating some sort of unambiguous measurement number, the function A may be integrated during a defined time interval or, in a sampled measurement, a weighted addition of $A_i$ may be carried out during a defined time interval, suitably in such a manner that some sort of average value is formed, or a numerical approximation of integration takes place. The time interval must of course be lower than or equal to the time 1/f, f being the pulse frequency. If this time is long, the time interval should be shorter and either be given a predetermined maximum value, or be related, by measurement, to the operating situation concerned.

The selection of the reference voltage $U_{ref}$ strongly affects the evaluation according to the proposed method. For a satisfactory optimization of the operation, $U_{ref}$ must be selected close to the voltage at which the corona discharge at the discharge electrodes starts. Since this voltage can hardly be monitored continuously during operation and also otherwise may be difficult to determine unambiguously—it depends on, among other things, the design and defects, if any, of the discharge electrodes, a simplified measurement during operation is suggested.

In this determination of $U_{ref}$, the size of the pulses is caused to vary at a constant pulse frequency, and the average value of the current and the corresponding top levels and bottom levels of the voltage between the electrodes are measured. Subsequently, the top levels and bottom levels are plotted as a function of the square root of the current. These two functions are approximated with expressions of the first degree. Since the top level and the bottom level near one another at low currents, these simplified approximative functions will intersect close to the zero level of the current. The level of the voltage in this point of intersection is used as the reference voltage $U_{ref}$ for this frequency.

It has become apparent from experience that even if the selection of the level of $U_{ref}$ is critical, $U_{ref}$ does not, according to the determination described above, vary very much as the pulse frequency varies. The mistake that is made if the level of $U_{ref}$ is set equal for moderately varying pulse frequencies thus is not crucial. Therefore there are also other possibilities of determining the level of $U_{ref}$. For example, use can be made of extrapolation of one of the functions, preferably the bottom level, to the zero level of the current. In extrapolation downwards, use can also be made of the intersecting point between e.g. the average level and the bottom level of the voltage or other, unambiguously defined current connections, the difference of which approaches zero as the current decreases.

The duration of the time interval during which the pulse is evaluated is not so critical as the level of the reference voltage $U_{ref}$. According to the proposed method, the time interval during which evaluation takes place should preferably be the time interval during which the corona discharge at the discharge electrodes takes place.

The start of the interval may thus be set at the point of time at which the current pulse begins. However, the corona discharge continues somewhat also after the end of the current pulse. The voltage in the precipitator is sufficient for a continued discharge.

The end of the interval should preferably be determined by analyzing the inclination of the decrease of the voltage by some sort of measurement of differences or numerical derivation. The end of the interval is then set at the point where the differential resistance exceeds a certain value, or at the point of time when a marked increase of the differential resistance takes place. If the differential resistance does not exceed the stated limit value, or if no marked increase of the resistance is registered, the time interval is set equal to the time between two pulse starts.

At high pulse frequencies, by which in this context frequencies above 10 Hz are meant, it should be possible to conveniently set the end of the interval at a fixed value or at the point of time of the next pulse start.

At low pulse frequencies, by which in this context frequencies below 10 Hz are meant, it should be possible to conveniently set the end of the interval at a fixed value in the range 30–100 milliseconds. This will be preferred to numerical derivation for measuring the resistance, if numerical derivation results in a strongly varying duration of the time interval.

BRIEF DESCRIPTION OF THE DRAWINGS

The invention will now be described in more detail with reference to the accompanying drawings in which.

Figure 6:
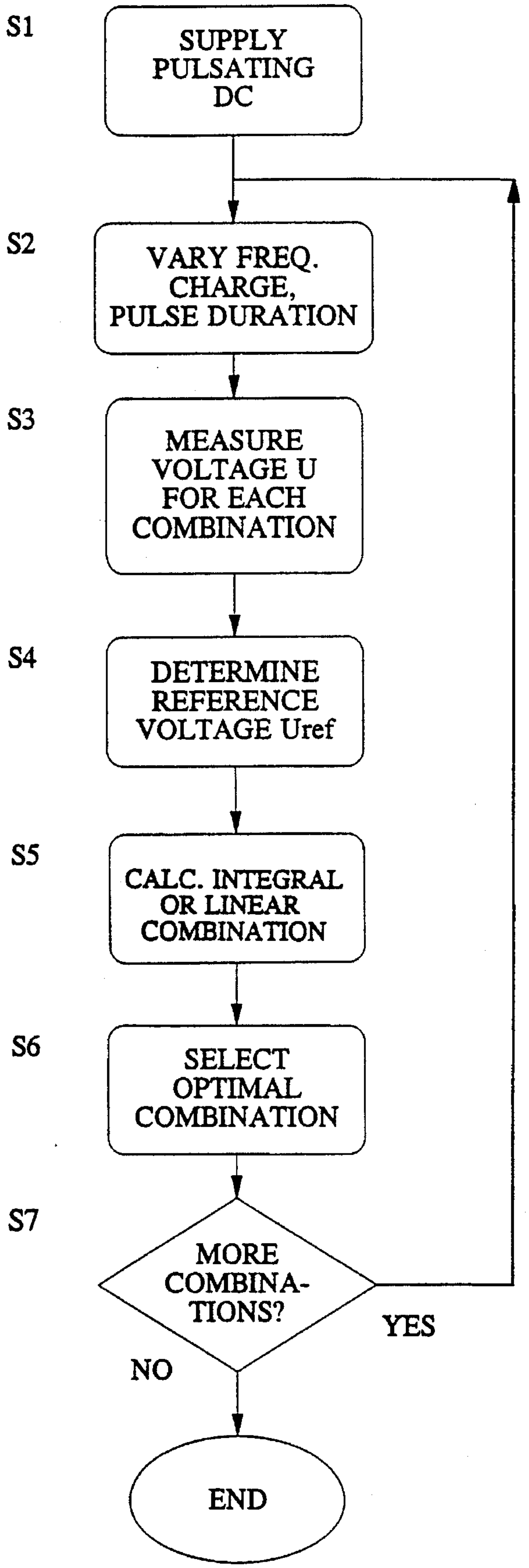

$A_i=U_i\cdot(U_i-U_{ref})$;

FIG. 6 is a flow chart of the disclosed method.

DESCRIPTION OF THE PREFERRED EMBODIMENTS

Figure 1A:
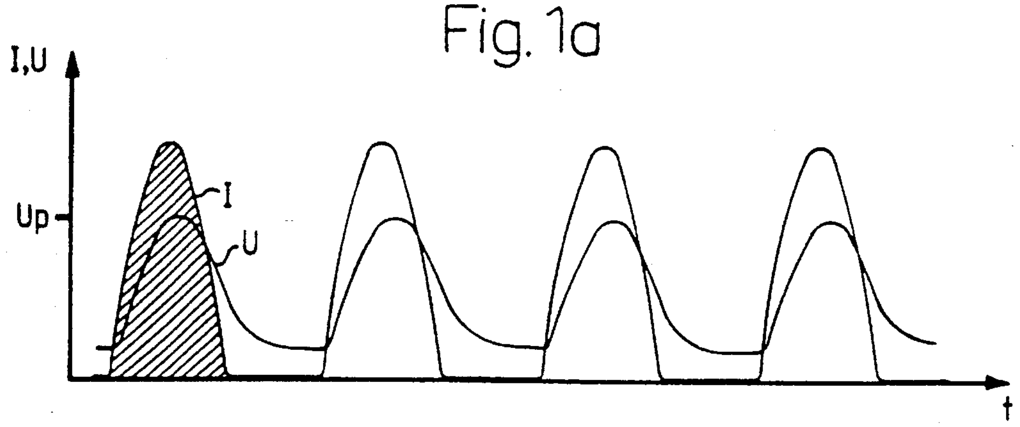
FIGS. 1*a* and 1*b* illustrate the fundamental relation between current and voltage as a function of the time in an electrostatic precipitator.
Figure 1B:
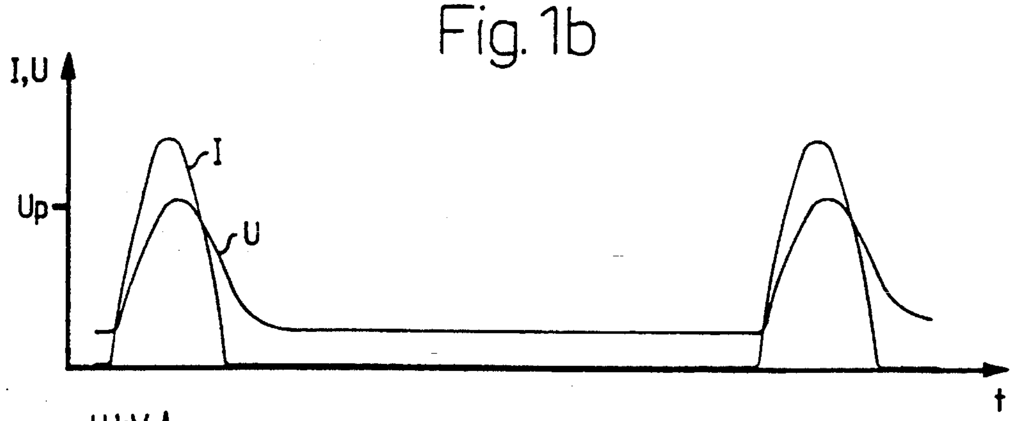

FIG. 1*a* shows the general relation between current and voltage in an electrostatic precipitator supplied with current from a phase angle controlled rectifier (thyristor rectifier) when the thyristors are ignited in all half periods of the alternating current (Step 1, FIG 6). FIG. 1*b* shows the same relation when the thyristors are ignited merely in every third half period. The method according to the present invention will ordinarily be used at significantly lower ignition frequencies than those illustrated, which for better clarity are not drawn to scale. The relation between the levels therefore is completely irrelevant.

Figure 2:
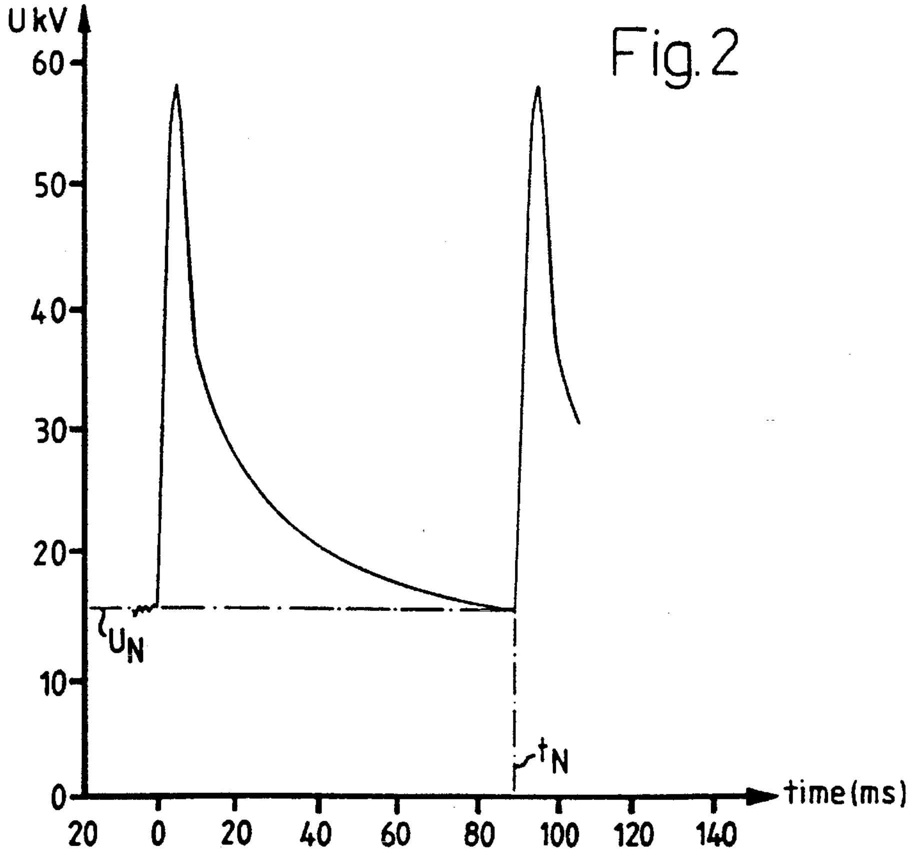
FIG. 2 shows the measured voltage as a function of the time in an electrostatic precipitator supplied with current pulses having a frequency of about 11 Hz.

FIG. 2 shows the actually measured voltage in a more realistic situation in which the thyristors are ignited in every ninth half period and then produce a very steep voltage increase, whereupon it first falls very steeply and then more and more slowly. The great difference between the top level and the bottom level of the voltage between the electrodes is quite realistic. The scale change renders comparisons with FIGS. 1*a* and *b* unsuitable. In FIG. 2, the top level of the voltage is about 58 kV and the bottom level $U_N$ about 16 kV as measured at time $t_N$.

Figure 3:
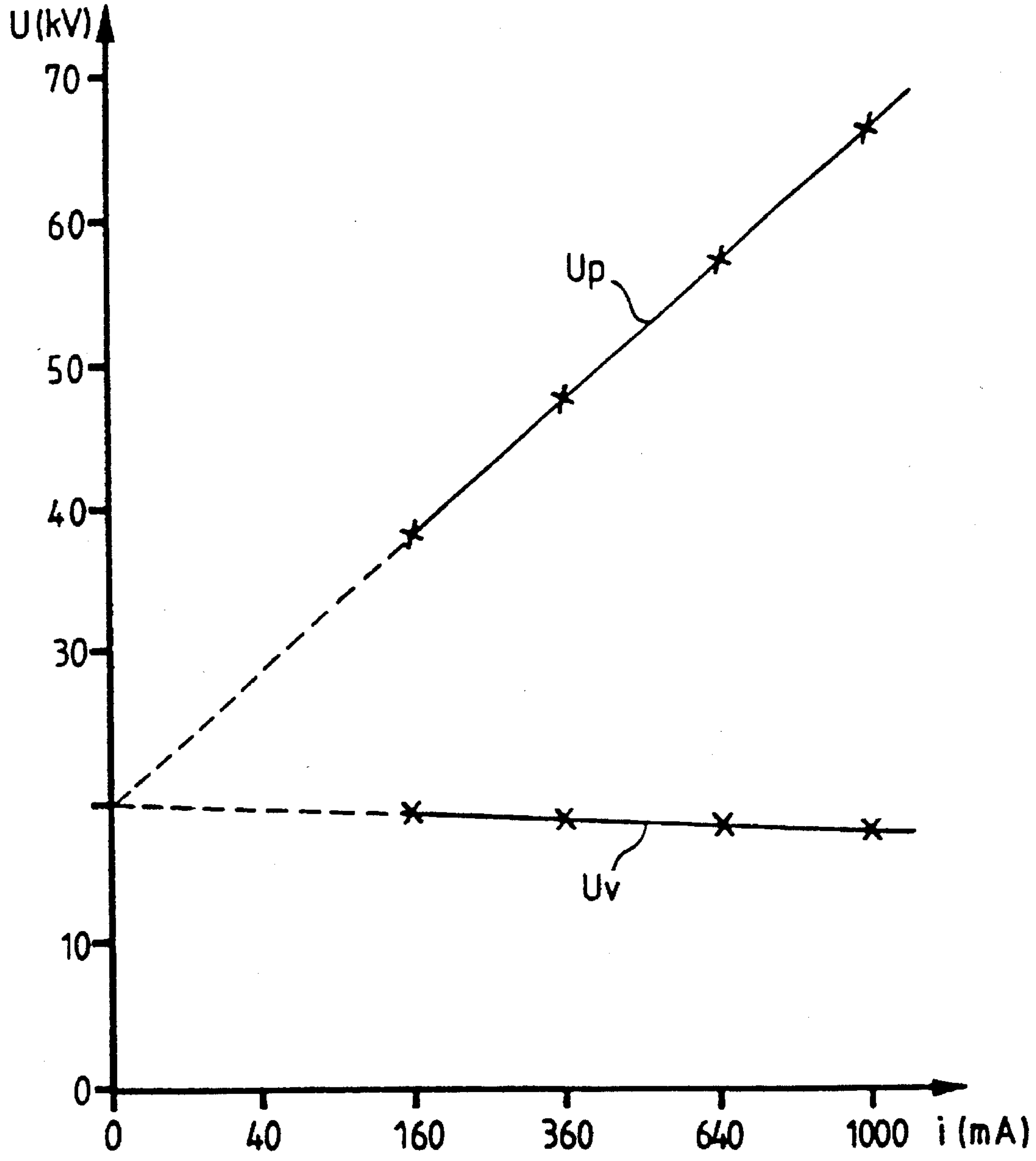
FIG. 3 shows the top level and bottom level of the voltage between the electrodes in an electrostatic precipitator, at a constant pulse frequency, as a function of the square root of the average level of the current through the precipitator.

If the firing angles of the thyristors are caused to vary at a constant frequency, both the top and bottom levels of the voltage will vary (Step 2, FIG. 6). Under favorable operating conditions or close to optimal operation, the bottom level $U_V$ is comparatively independent of the firing angle, while the top level $U_P$ grows monotonously with a decreasing firing angle, i.e. an increased conducting period of the thyristors. Under complicated operating conditions and when operating with unsuitable parameters, the bottom voltage decreases with a decreasing firing angle. FIG. 3 illustrates these measurements (Step S3, FIG. 6) for a given pulse frequency in close to optimal operation.

In the diagram, the top and bottom levels of the voltage at four different firing angles have been plotted as a function of the square root of the current (average value). The diagram shows that the relation largely is linear, and that the two functions, extrapolated towards lower values of the current, intersect fairly close to the voltage axis, i.e. where the current is zero. It is not necessary to carry out the measurement in connection with more than a few levels of the current. Owing to the good linearity, 2–4 measurements are sufficient to determine the point of intersection and, thus, the value of $U_{ref}$ (Step 4, FIG. 6). According to the preferred method, the interruption of the operation will therefore be neither extensive nor long.

When starting the plant, a value of experience or a value of $U_{ref}$ stored from the preceding operating occasion is used. When changing the pulse frequency and at regular intervals, $U_{ref}$ is measured during operation for checking and, if required, adjustment for example every half-hour.

Figure 4:
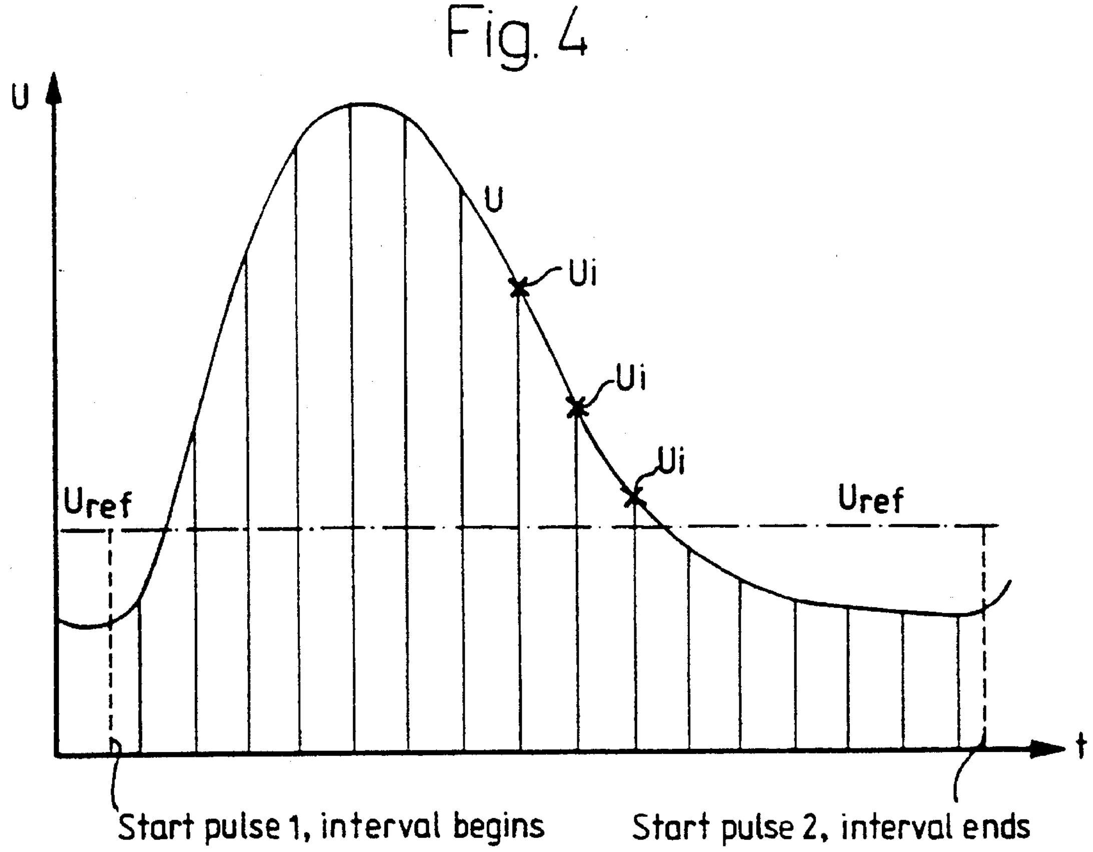
FIG. 4 illustrates a fundamental method for measuring the voltage between the electrodes by means of so-called sampling.
Figure 5:
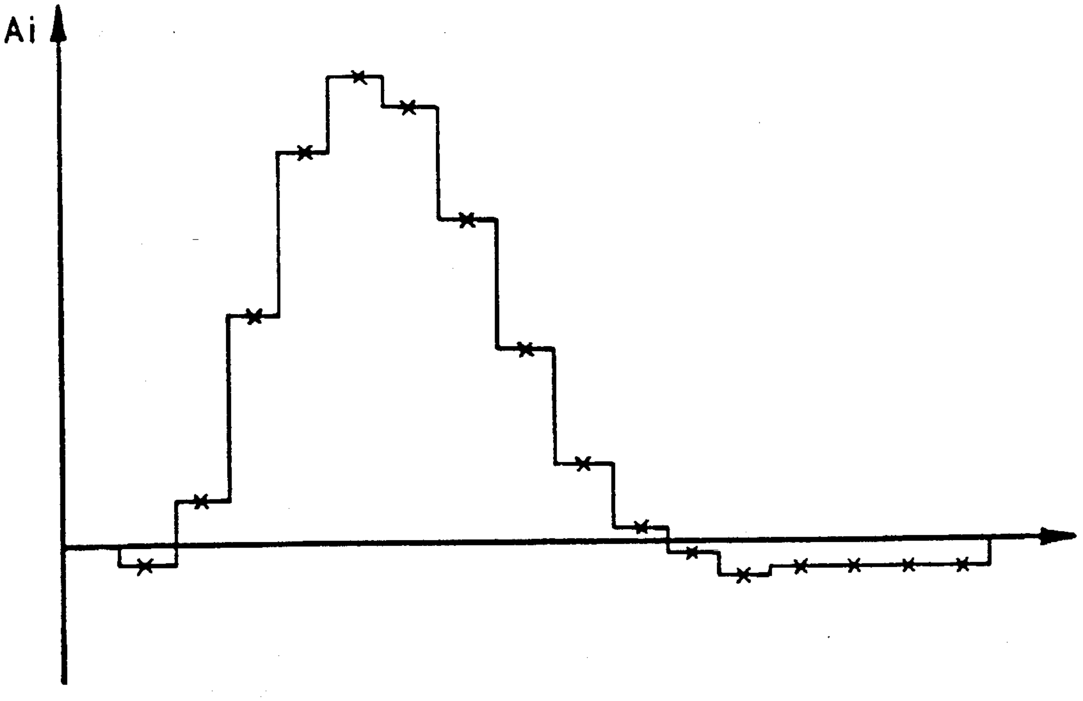
FIG. 5 shows the function calculated from FIG. 4

FIG. 4 is a picture which for better clarity is slightly distorted, showing how the voltage between the electrodes of the precipitator varies with the time during the interval from a current pulse start to the start of the next current pulse. It is also indicated that measurements of the voltage $U_i$ take place at a plurality of discrete, evenly distributed points of time. In the practical case, measurements take place at a significantly greater number of points of time than those illustrated, for example 1–3 times per millisecond. These measurement values are stored in a control unit, preferably computerised (not shown), and by means of the value of $U_{ref}$, which is also stored in the control unit $A_i=U_i\cdot(U_i-U_{ref})$ is calculated for each measuring point (Step S5, FIG. 6). FIG. 5 shows the value of $A_i$ for the example concerned.

Subsequently, the integral $I_k=\int U\cdot(U-U_{ref})\cdot dt$ is numerically estimated for the entire interval by differential addition of $A_i$, calculated as stated above and multiplied by the time difference between two discrete measurements. The differences in time are in this case constant. This calculation is carried out automatically in the control unit, and the result is stored as a "figure of merit" for the present combination of pulse frequency and firing angle of the thyristors.

In the suggested method, the pulse frequency and the firing angle are caused to vary, thereby forming a plurality of combinations. For each pulse frequency, first the voltage $U_{ref}$ is measured as described above, and then $U_i$ is measured at a plurality of firing angles. After calculating the corresponding $A_i$, the combination concerned is given its "figure of merit". If there is a maximum in the examined area, this is searched out and the parameters thereof are used in the continued operation. If, however, the greatest "figure of merit" is to be found at the edge of the examined area, the frequency and the firing angle are again caused to vary, based on the parameters which gave this greatest value of the "figure of merit".

Such adjustment continues until a maximum is achieved (Step S6, FIG. 6). In continuous operation, the parameters are checked and a new adjustment takes place at regular intervals, for example once every half-hour (Step S7, FIG. 6). During this space of time, small variations of the firing angle take place in a predetermined manner at a constant pulse frequency, while the "figure of merit" of the pulse is correspondingly evaluated and the parameters are adjusted, if required, to ensure that the operation is as close to an optimum as possible. Such small adjustments may be carried out e.g. once every minute.

In the embodiment described above, it is assumed that the pulse frequency is not too low. At frequencies below 10 Hz, it is suggested that the evaluation takes place during an interval which is shorter than the time between the start of two consecutive pulses. This is possible either by determining a value of the interval, which is fixed for each frequency, and storing it in the control unit, or by determining the length of the interval by evaluating the decrease in voltage, the value also in this case being kept constant for the same frequency at varying firing angles.

Such evaluation is suggested to take place by assuming that the voltage between the electrodes of the precipitator is determined by the relation $$U_x = U_y \cdot exp[(t_y - t_x)/(R \cdot C)]$$

If C, the capacitance of the separator, is assumed to be constant, experience shows that the resistance R varies. If the point of time "x" is set equal to the current point of time "i" and the point of time "y" is set at the time for starting the next pulse "N", the following function is obtained $$R_i = (t_N - t_i)/[C \cdot ln(U_i/U_N)]$$

This $R_i$ strongly increases when the corona discharge ceases, and then the end of the evaluation interval is set at the point of time when this takes place.

Alternatively, numerical derivation may be used for the same evaluation. This means that the end of the evaluation interval is determined by the point of time when $$R = -U/(C \cdot dU/dt)$$

strongly increases or exceeds a given value.

Alternative Embodiments

The method according to the invention is of course not limited to the embodiment described above, but may be modified in various ways within the scope of the appended claims.

The method can be applied to a number of other ways of supplying current in the form of pulses to electric precipitators. Examples of such ways are pulse-width-modulated high frequency and other forms of so-called "switch modes", as well as the use of thyristors which can be "switched off". The method is also suited for the very special pulse rectifiers which generate pulses in the size of microseconds, even if this involves technical difficulties in the actual measurement.

Examples of modifications of the method are other ways of determining the level of $U_{ref}$ and the introduction of weighting in the adding of the function $A_i$.

I claim:

1. A method for controlling, in an electrostatic precipitator unit comprising discharge electrodes and collecting electrodes between which a varying high voltage is maintained, said method comprising the steps of:

supplying a pulsating direct current to said electrodes;

causing at least one of frequency, pulse charge and pulse duration of a pulsating direct current applied to said electrostatic precipitator to vary thereby obtaining a plurality of combinations of frequency, charge and duration;

measuring for each of said combinations a voltage U between said discharge electrodes and said collecting electrodes;

determining for each of said combinations a reference voltage level $U_{ref}$;

determining for each of said combinations one of an integral $I_k = \int U \cdot (U - U_{ref}) \cdot dt$ during a defined time interval, and a linear combination of $A_i = U_i \cdot (U_i - U_{ref})$ at a number of points of time i in a defined time interval; and selecting an optimal combination of frequency, charge and duration of said pulsating direct current based on one of said integral $I_k$ and said linear combinations of $A_i$ to control the electrostatic precipitator.

2. A method as claimed in claim 1, wherein the defined time interval begins when the current pulse begins.

3. A method as claimed in claim 1, wherein the defined time interval terminates when the resistance R of the precipitator, defined by the discharge function $$R = (ty - tx)/C \cdot ln(Ux/Uy)$$

wherein C is the capacitance of the precipitator, exceeds a given level.

4. A method as claimed in claim 1, wherein the defined time interval terminates when the resistance R of the precipitator, defined by the discharge function $$R = -U/(C \cdot dU/dt)$$

wherein C is the capacitance of the precipitator, exceeds a given level.

5. A method as claimed in claim 1, wherein the defined time interval terminates when the voltage U falls a predetermined amount, the predetermined amount being defined by one of the following: a defined level and a given amount of the difference between the present top level and the present bottom level from the top level.

6. A method as claimed in claim 1, wherein the defined time interval terminates when the following current pulse begins.

7. A method as claimed in claim 1, wherein the defined time interval is set essentially equal to the time during which corona discharge occurs during a current pulse.

8. A method as claimed in claim 7, wherein $U_i$ is measured and $A_i$ is calculated at points of time which are evenly distributed during the defined time interval.

9. A method as claimed in claim 8, comprising the further steps of: calculating an average level $A_m$ of $A_i$ in a time interval, and selecting the combination of frequency, charge and duration, which gives the highest level of $A_m$.

10. A method as claimed in claim 7, wherein the combination of frequency, charge and duration, which gives the highest level of $I_k$, is selected.

11. A method as claimed in claim 1, wherein said reference voltage level $U_{ref}$ is set approximately equal to an ignition voltage of corona discharge.

12. A method as claimed in claim 11, wherein the defined time interval is set essentially equal to the time during which corona discharge occurs during a current pulse.

13. A method as claimed in claim 11, further comprising the steps of:

measuring at least two of a top level, a bottom level, an average level and a predetermined level of the voltage U between said discharge electrodes for a number of different pulse currents at one and the same pulse repetition frequency;

plotting said measured voltage levels U as at least two functions of the square root of the current through the precipitator;

approximating said at least two functions with expressions of a first degree; and selecting a voltage for which two of said functions have the same current or the voltage where at least one of the functions intersects the voltage axis, corresponding to zero current as a reference voltage $U_{ref}$.

14. A method as claimed in claim 13, wherein the defined time interval is set essentially equal to the time during which corona discharge occurs during a current pulse.

15. A method as claimed in claim 11, comprising the further steps of:

said $U_{ref}$ is determined by measuring at least two of a top level, bottom level, average level of the voltage U and a predetermined voltage level for a number of different pulse currents at one and the same pulse repetition frequency;

plotting said at least two of said bottom, average and predetermined voltage levels as a function of a current through the precipitator;

extrapolating said functions in relation to lower current levels; and selecting a voltage for which two of the extrapolated functions have the same current, or voltage where one of the extrapolated functions intersects the axis of voltage, corresponding to zero amps of current, as said reference voltage $U_{ref}$.

16. A method as claimed in claim 15, wherein the defined time interval is set essentially equal to the time during which corona discharge occurs during a current pulse.

17. A method as claimed in claim 11, comprising the further steps of:

$U_{ref}$ is determined by measuring the top and bottom level of the voltage U for a number of different pulse currents at one and the same pulse repetition frequency;

plotting the top levels and the bottom levels as a function of the square root of the current through the precipitator to generate a number of functions corresponding to each of the different pulse currents;

approximating the functions with expressions of the first degree; and selecting a voltage for which the functions have the same current as said reference voltage $U_{ref}$.

18. A method as claimed in claim 17, wherein the defined time interval is set essentially equal to the time during which corona discharge occurs during a current pulse.

19. A method as claimed in claim 11, comprising the further steps of:

measuring a bottom level of the voltage U for a number of different pulse currents at one and the same pulse repetition frequency;

plotting the bottom level as a function of the square root of the current through the precipitator;

approximating the function with expressions of the first degree; and selecting a voltage for which the current through the precipitator is zero, as reference voltage $U_{ref}$.

20. A method as claimed in claim 19, wherein the defined time interval is set essentially equal to the time during which corona discharge occurs during a current pulse.

* * * * *